Jan. 23, 1934.                G. AJELLO                1,944,484
SAFETY DEVICE FOR AIRCRAFT
Filed April 18, 1931
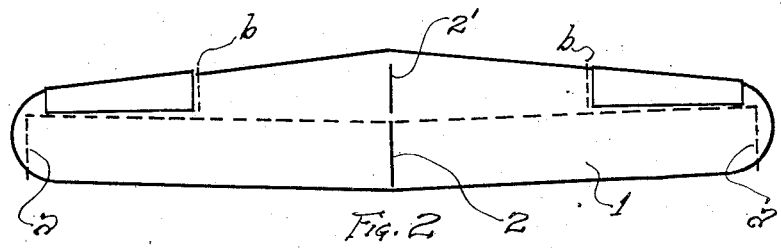
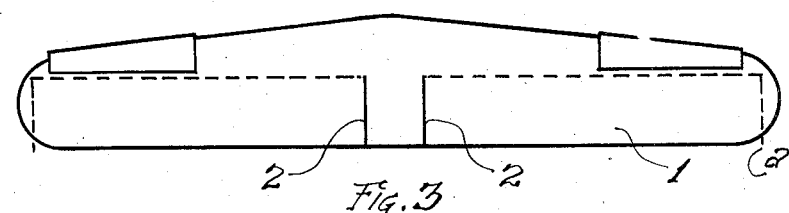
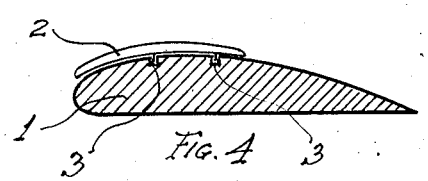
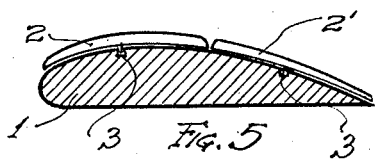
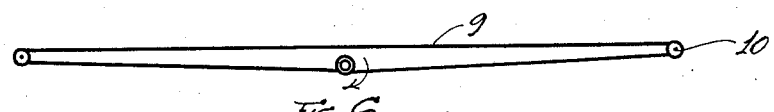
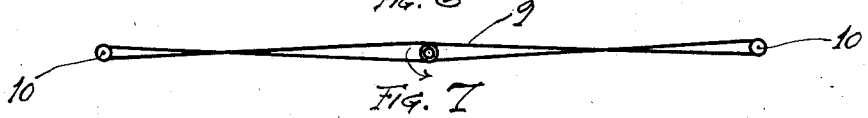
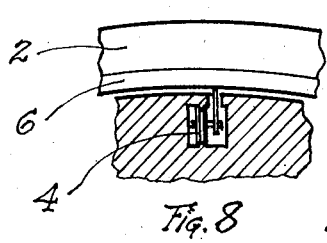
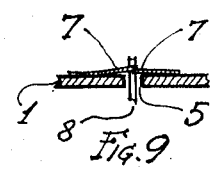
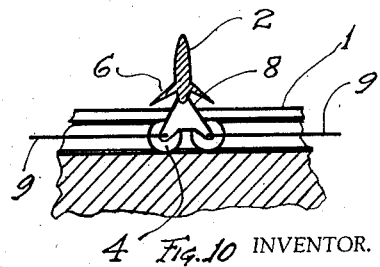
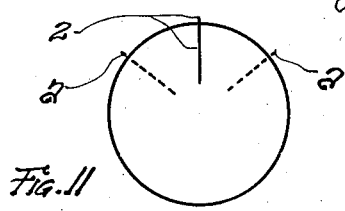
INVENTOR.

Patented Jan. 23, 1934

1,944,484

UNITED STATES PATENT OFFICE 1,944,484

SAFETY DEVICE FOR AIRCRAFT

Gaetano Ajello, New York, N. Y.

Application April 18, 1931. Serial No. 531,119

6 Claims. (Cl. 244—31)

This invention relates to a device to remove or prevent the accumulation of snow and ice from any exposed surface or part of a surface of an aircraft, be it a wing, a fuselage, a sustaining surface, the hull of a dirigible, a tail, etc.

I attain this object and others that may be of logical correlation by merely moving a knife forth and back on the surface to be protected so to sweep off the snow or ice that collects upon it.

In the accompanying sheet of drawings:

Fig. 1 represents the front view of a wing with the knife centrally located. This figure is also illustrative of a tail surface.

Fig. 2 is the plan view of the same wing illustrating the position of the knife and its course of movement.

Fig. 3 is another plan view of a wing with two knives.

Fig. 4 is a detail section of a wing corresponding to Figs. 1 and 2 and illustrating a single knife with two moving attachments to the wing. This figure is also illustrative of a similar arrangement of parts longitudinally (sectional view) of a dirigible.

Fig. 5 is a detail section of a wing illustrating two separate knives, each with a single moving attachment to the same wing.

Fig. 6 is a schematic front illustration of one of the possible control means that may be adopted for the movement of the knife corresponding to Figs. 1 and 2.

Fig. 7 is a similar front schematic illustration of the controls for two knives and corresponding to Fig. 3.

Fig. 8 is a detail section through a part of the wing illustrating a typical movable attachment of the knife to the wing.

Fig. 9 is an enlarged detail section through a portion of the wing showing a typical slot and covering on the wing to allow the passage of the attachment means of the knife.

Fig. 10 is an enlarged section (through the slot of Fig. 9) along a portion of the wing, illustrating a typical mechanical arrangement for the movement of the knife corresponding to Fig. 8.

Fig. 11 is the front view of the hull of a dirigible with the knife centrally located. This figure is also illustrative of a similar arrangement on a fuselage.

Referring by numerals (I shall refer to a wing as typical for any surface), 1 represents the wing, 2 the knife movably connected to the wing by means of attachments 3 which comprise wheels or pulleys 4 (Figs. 8 and 10) that move preferably on a track to carry the knife forth and back along the length of the wing through slot 5 (Fig. 9) and keep it always, as much as possible, at a uniform distance from the outer surface of the wing or whatever surface to be protected.

The knife 2 may be kept in contact with the surface to be protected by means of a thin sheet of flexible material (which is superfluous to illustrate) attached to it or may terminate with blades 6 (Figs. 8 and 10) at close distance from the outer surface.

The wing slot 5, (Fig. 9) is preferably covered by two thin sheets 7 of flexible material like rubber, preferably overlapping each other for dripping purposes and through which the attachment 8 of the knife forces its way forth and back.

The dotted lines in Figures 1, 2 and 3 indicate the locus of movement of an edge of a knife.

It is evident that by a small drum placed in the very wing or anywhere else, wires 9 (Figs. 6, 7 and 10) would be wound or unwound through any well known mechanical means including an automatic control that would cause the knife to sweep through the wing and automatically return and continue methodically the movement.

I do not show the course of slot 5 in Figs. 2, 3 and 11 because it may be placed in any direction suitable according to the variation of the surface to be protected as it is also superfluous to illustrate that the knife may be slidably attached to its wheel carriage transversely of the wing or that it may comprise several sections hinged together etc.

It is also clear that I may place one knife back of the other on the same surface as 2' Fig. 2 where the movement of the front knife may be arranged to cause through any well known mechanical or electrical means the movement of the back knife and make it stop at b, Fig. 2, while the front knife would continue its travel to a and on its return would pick up again the movement of the rear knife at b. Heating means may be added at the interior of a surface especially along the slots.

I claim:

1. On an aircraft wing, a knife structure, a slot or track within said wing, antifriction contact means between said knife structure and the slot or track, and control means to move said knife structure forth and back along said wing.

2. On an aircraft wing, a knife structure applied at the upper fore part of the wing, a slot or track within said fore part of the wing, antifriction contact means between said knife structure and said slot or track, and control means to move said knife structure forth and back along said upper fore part of the wing.

3. On a dirigible hull, a knife structure applied at the upper surface of said hull, a slot or track within said upper surface of the hull, antifriction contact means between said knife structure and said slot or track and control and mechanical means to move said knife structure forth and back along said upper surface of the hull.

4. On a fuselage, a knife structure applied at a part of the upper surface of said fuselage, slots or a track within said upper surface of the fuselage, antifriction contact means between said knife structure and said slots or track and any control and mechanical means to move said knife structure forth and back in any direction along said upper surface of the fuselage.

5. On an aircraft tail, a knife structure, a slot or track within said tail, antifriction contact means between said knife structure and said slot or track and control means to move said knife structure forth and back along said tail.

6. On an aircraft tail, a knife structure applied at the upper fore part of said tail, slots or a track within said fore part of the tail, antifriction contact means between said knife structure and said slots or track and any control and mechanical means to move said knife structure forth and back along said upper surface of the tail.

GAETANO AJELLO.